Sept. 30, 1952 W. DIETZ 2,612,076
AUXILIARY NOSE PIECE FOR BIFOCAL EYE GLASSES
Filed Oct. 2, 1950
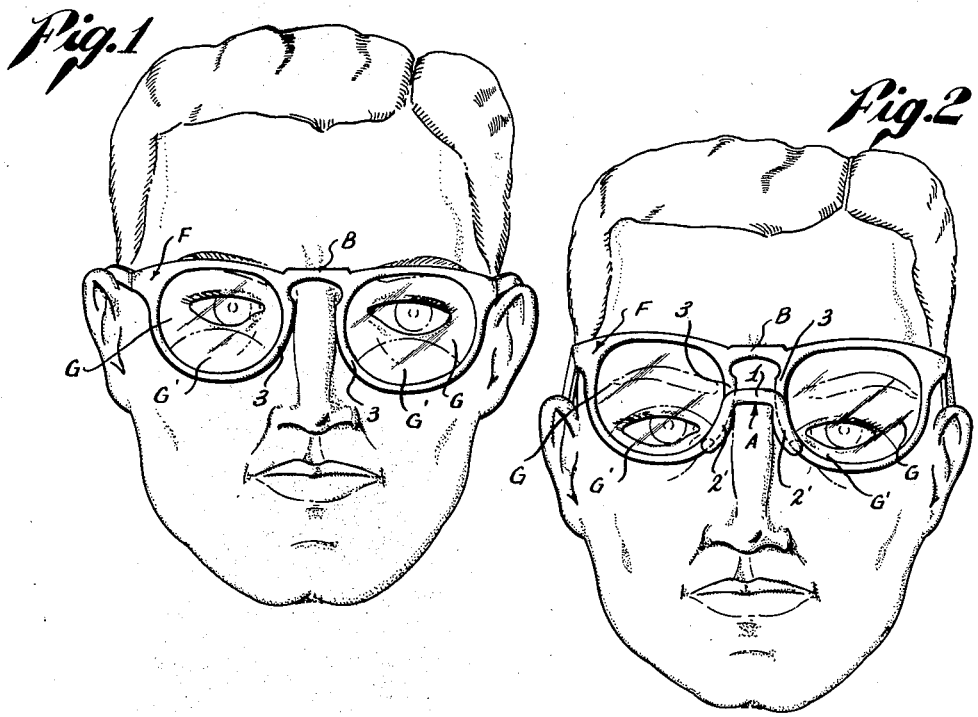
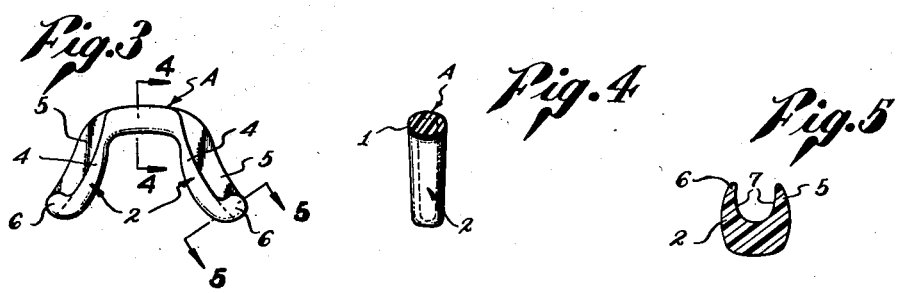
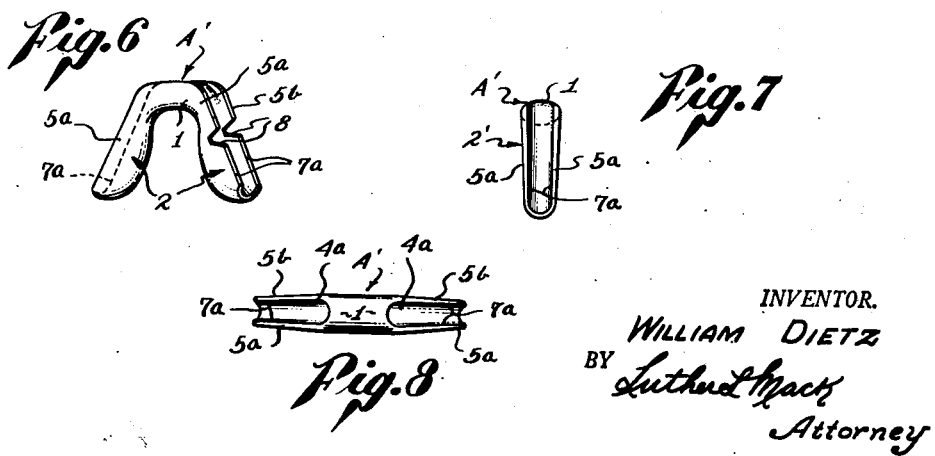
INVENTOR.
WILLIAM DIETZ
BY Luther L. Mack
Attorney Patented Sept. 30, 1952

2,612,076

UNITED STATES PATENT OFFICE 2,612,076

AUXILIARY NOSE PIECE FOR BIFOCAL EYE GLASSES

William Dietz, Hollywood, Calif.

Application October 2, 1950, Serial No. 188,001

4 Claims. (Cl. 88—51)

This invention relates to and has for an object the provision of an auxiliary nose piece for bifocal eye glasses adapted to be detachably secured to the inner marginal portions of the lenses or to the frames therefor at a position below the usual bridge of spectacle type glasses or the usual nose pieces of pince-nez type glasses. The auxiliary nose piece may be readily mounted and used for elevating the short distance lenses and the optical axis so that when the head of a user is comfortably erect, as when reading, the upper areas of reading matter may be read without tilting the head backwardly.

It is well known by users of bifocal eye glasses that when reading newspapers or large sheets of printed matter it is necessary to either lower the paper to the normal and comfortable optical axis of the short distance lenses, or to tilt the head backwardly in order to read the upper areas of the paper. In the first mentioned case movement of the paper requires refocusing and recovery of reading position, while in the second case discomfort to the reader results.

I am aware that devices for a similar purpose have heretofore been used and patented but such devices have consisted of means for adjusting a single bridge or nose piece on the frame of a nose piece or pieces adjustable vertically relative to the bridge of the frame or to a fixed nose piece, and in most cases required special frames and delicate parts which increased the initial cost to a user and were susceptible to damage and consequent inconvenience to a user.

It is an object, therefore, to provide a simple, economical and effective auxiliary nose piece of light weight material such as plastic, which is readily conformable to and adapted to be frictionally held on marginal portions of either eye glass frames or lenses for supporting the lenses in comfortable reading position, and readily removed at will for normal long or short distance vision when reading is discontinued.

Other objects may appear as the description progresses.

I have shown a preferred form of auxiliary nose piece embodying my improvements, together with minor modifications thereof, in the accompanying drawing, in which:

Fig. 1 is a front view of a conventional pair of bifocal eye glasses with a frame around the glasses, a bridge and temples from the frame extended rearwardly over the ears of a user, and in which the auxiliary nose piece is omitted;

Fig. 2 is a view similar to Fig. 1 but with the auxiliary nose piece positioned on the nose of a user;

Fig. 3 is a detached side view of one form of nose piece;

Fig. 4 is a sectional view on line 4—4 of the nose piece of Fig. 3;

Fig. 5 is a cross sectional view of the same on line 5—5 of Fig. 3;

Fig. 6 is a perspective view of a modified form of nose piece;

Fig. 7 is an end view of the same; and

Fig. 8 is a top plan view thereof.

As best shown in Figs. 2, 3 and 6, an auxiliary nose piece embodying my improvements includes an integral saddle-like member A as in Fig. 3 or A' as in Fig. 6, formed of a suitable plastic material, with a bridge 1 and depending outwardly flaring legs as at 2, 2 in Fig. 3 or 2', 2' in Fig. 6. Said legs, in either case are curved to nominally correspond to the inner marginal portions 3, 3 of eye glass frames F or to corresponding marginal portions of glasses G, G and are cross sectionally formed so as to frictionally grip the marginal portions 3, 3 of the frame F or the glasses G, G for retention of the members A or A' on the frame or glasses during use thereof.

To such end the legs 2, 2 of the form shown in Fig. 3 have webs 4, 4 with ribs 5, 5 extended outwardly therefrom on the front side of member A and ears 6, 6 extended rearwardly from said webs at the rear side of the body. Ears 6, 6 are spaced from the ribs 5, 5 so as to provide a channel 7 between each ear 6 and each rib 5 for frictionally receiving a marginal portion 3 of frame F. Obviously more than a single ear 6 may be provided on each leg 2 above ear 6 as may be desired or necessary.

The channel 7 may be of varied width or of nominal minimum width and widened to tightly fit the arc and contour of the frame portions 3 or corresponding marginal portions of glasses G, G. In this connection it may be understood that both spectacle and pince-nez types of eye glasses are frequently used either with or without plastic or metal frames, and that the thickness of frames varies from a minimum of metal frames to a maximum of plastic frames. Hence the members A and A' may be made in different sizes or the channels 7 enlarged appropriately from a minimum width to a necessary width for ready adaptation to various types of eye glasses.

The form of nose piece shown in Fig. 6 conforms in contour and effect to the form of Fig. 3 but in certain minor details is different therefrom. For instance the legs 2', 2' are of continuous channeled cross sections with front ribs 5a and rear ribs 5b spaced apart to form channels 7a, 7a outwardly of the webs 4a, 4a, as shown in Figs. 6 and 7. In this form of nose piece the channels 7a, like the channels 7 of the first mentioned form, are frictionally held on the frame portions 3.

The form of both members A and A' is such as to comfortably fit and rest on the bridge of the nose of a user when disposed below the bridge B of frame F, the legs 2 and 2' being so curved as to form a substantial and nose fitting arch below bridge 1.

Occasionally to comfortably conform the arch of the nose piece and the disposition of the legs to different persons it may be necessary to slightly spread or contract the legs, and because of the channelled or flanged cross section of the nose pieces, such operations may be difficult or impossible without distorting or breaking the legs. Hence, it may be desirable at times to provide one or more notches 8 in the flanges 5 of unit A or 5a of unit A' so as to permit ready bending of the webs 4 or 4a without damage to said flanges.

In all eye glasses the inner margins of the glasses G and of frame F diverge on corresponding arcs or angles, and the legs of units A and A' are correspondingly divergent, the nose pieces of minor width at the top and major width at the bottom in each case. Thus the members A and A' are readily affixed to frame F or glasses G by gently forcing said members upwardly in the arch between the glasses until the marginal portions 3 of the frame or corresponding portions of the glasses are firmly but removably seated in the channels 7 or 7a of the nose pieces.

When thus properly positioned the bridge 1 will not interfere with any portion of the glasses or frame, the form A being specially formed to avoid interference with the tensioned nose pieces of pince-nez type of glasses.

Obviously, when, as shown in Fig. 1, the glasses are arranged on a user they are adapted for long range vision through the glasses G, but when elevated by the employment of the nose piece A or A', as for the purpose of reading, as shown in Fig. 2, vision is through the short range lenses G', G'.

My invention, therefore, consists in the provision of the auxiliary nose piece arranged for detachable connection with the glasses G or frame F in a position of non-interference with parts or portions of conventional frames or glasses, not an integral part of or fixture permanently applied to either the glasses or frame and readily conformable, as a temporary adjunct to various types of bifocal glasses with but a minimum of fitting operations, for providing a maximum of comfort to readers.

I claim:
1. A detachable auxiliary nose piece for spectacles which have optically spaced bifocal lenses and applicable for elevating the lenses from normal distant vision position to near vision position; said nose piece being of unitary structure and formed with arcuate diverging legs and a bridge connecting upper portions of said legs, said legs having external channels so contoured as to conform to and frictionally receive inner segments of the spectacles and having nose engaging surfaces on their inner sides.

2. A detachable auxiliary nose piece for spectacles as set forth in claim 1 in which the channels on the legs extend throughout the length of the legs and provide laterally spaced flanges adapted to overlie the obverse and reverse surfaces of the spectacles.

3. A detachable auxiliary nose piece for spectacles as set forth in claim 1 in which laterally spaced flanges of different length are formed at opposite sides of said channels.

4. A detachable auxiliary nose piece for spectacles as set forth in claim 1 in which the channels on the legs extend throughout the length of the legs and provide laterally spaced flanges adapted to overlie the obverse and reverse surfaces of the spectacles, said flanges being notched between the extremities of said legs to permit flexure of the legs to accommodate the contour of the legs to the curvature of the spectacles.

WILLIAM DIETZ.

REFERENCES CITED

The following references are of record in the file of this patent:

UNITED STATES PATENTS

| Number | Name | Date |
| --- | --- | --- |
| Re. 20,732 | Yoe | May 17, 1938 |
| 329,474 | Meyrowitz | Nov. 3, 1885 |
| 2,233,698 | Girouard | Mar. 4, 1941 |
| 2,267,997 | Spray | Dec. 30, 1941 |
| 2,354,603 | Malcom | July 25, 1944 |
| 2,459,051 | Smith | Jan. 11, 1949 |
| 2,582,345 | Moeller | Jan. 15, 1952 |